(12) United States Patent
Teyeb et al.

(10) Patent No.: US 9,198,095 B2
(45) Date of Patent: Nov. 24, 2015

(54) INTER-RAT COORDINATION OF MOBILITY SETTINGS

(71) Applicant: Telefonaktiebolaget L M Ericsson (publ), Stockholm (SE)

(72) Inventors: Oumer Teyeb, Solna (SE); Angelo Centonza, Winchester (GB); Icaro L. J. Da Silva, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 302 days.

(21) Appl. No.: 13/879,693

(22) PCT Filed: Mar. 14, 2013

(86) PCT No.: PCT/SE2013/050247
§ 371 (c)(1),
(2) Date: Apr. 16, 2013

(87) PCT Pub. No.: WO2013/169172
PCT Pub. Date: Nov. 14, 2013

(65) Prior Publication Data
US 2014/0220980 A1    Aug. 7, 2014

Related U.S. Application Data

(60) Provisional application No. 61/645,708, filed on May 11, 2012, provisional application No. 61/645,090, filed on May 10, 2012.

(51) Int. Cl.
*H04W 36/00* (2009.01)
*H04W 88/10* (2009.01)

(52) U.S. Cl.
CPC ...... *H04W 36/0066* (2013.01); *H04W 36/0083* (2013.01); *H04W 88/10* (2013.01)

(58) Field of Classification Search
CPC ............... H04W 36/0094; H04W 36/0066; H04W 36/0083
USPC ............... 455/437, 438, 439, 552.1
See application file for complete search history.

(56) References Cited

U.S. PATENT DOCUMENTS

2013/0070679 A1*    3/2013    Wegmann et al. ............ 370/328

FOREIGN PATENT DOCUMENTS

WO    WO 2011/131225 A1    10/2011

OTHER PUBLICATIONS

Ericsson et al. "Add management of IRAT ANR from UTRAN to E-UTRAN", S5-113226, 3GPP TSG SA WG5 (Telecom Management) Meeting #79, Oct. 10-14, 2011; Nanjing, P.R. China, , 17 Pages.

(Continued)

*Primary Examiner* — Barry Taylor
(74) *Attorney, Agent, or Firm* — Myers Bigel Sibley & Sajovec, P.A.

(57) ABSTRACT

The present invention relates to a method in a first radio network node of a first radio access technology, for communicating mobility parameter changes to a second radio network node of a second radio access technology. The method comprises determining (610) an updated value of a first threshold controlling when a handover to the second radio access technology is triggered, and sending (620) information related to the updated value of the first threshold to the second radio network node, wherein the information comprises an indication of a type of a measurement associated with the first threshold.

20 Claims, 8 Drawing Sheets

(56) References Cited

OTHER PUBLICATIONS

Huawei "IRAT MRO way forward", R3-120390, 3GPP TSG RAN WG3 Meeting #75, Dresden, Germany, Feb. 6-10, 2012, 3 Pages.

International Search Report and Written Opinion Corresponding to International Application No. PCT/SE2013/050247; Date of Mailing: Jun. 14, 2013; 13 Pages.

Nokia Siemens Networks, "Avoiding pong-pongs in inter-RAT environment", R3-102344, 3GPP TSG RAN Meeting #69, Madrid, Spain, Aug. 23-27, 2010, 4 Pages.

Nokia Siemens Networks, "Avoiding unnecessary handovers in inter-RAT environment", R3-103552, 3GPP TSG RAN WG3 Meeting #70, Jacksonville, USA, Nov. 15-19, 2010, 4 Pages.

Nokia Siemens Networks, "Goal of Multi-RAT Mobility Robustness optimization", R3-101643, 3GPP TSG RAN WG3 Meeting #68, Montreal, Canada, May 10-14, 2010, 3 Pages.

Nokia Siemens Networks, "The way forward for inter-RAT ping-pong", R3-120400, 3GPP TSG RAN WG3 Meeting #75, Dresden, Germany, Feb. 6-10, 2012, 1 Page.

Written Opinion of the International Preliminary Examining Authority Corresponding to International Application No. PCT/SE2013/050247; Date of Mailing: Apr. 7, 2014; 7 Pages.

* cited by examiner

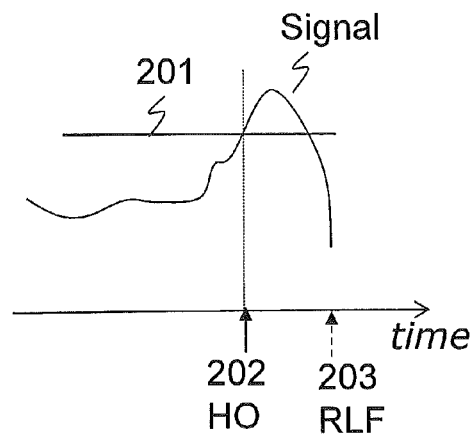
Fig. 2a
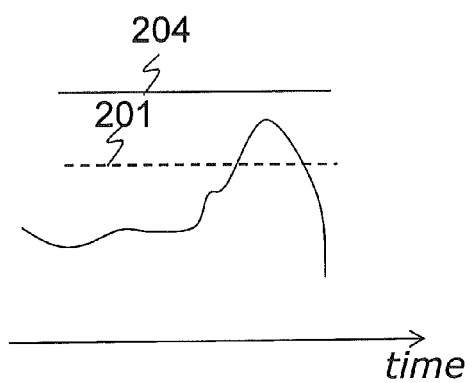 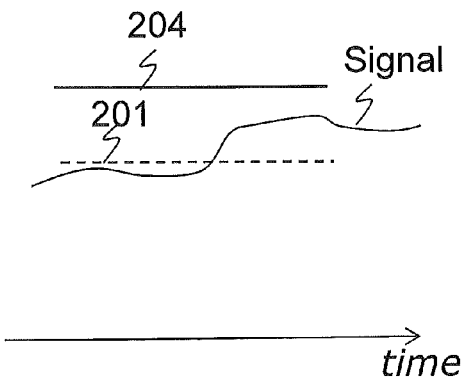
Fig. 2b  Fig. 2c

INTER-RAT COORDINATION OF MOBILITY SETTINGS

CROSS REFERENCE TO RELATED APPLICATIONS

This application is a 35 U.S.C. §371 national stage application of PCT International Application No. PCT/SE2013/050247, filed on 14 Mar. 2013, which itself claims the benefit of U.S. provisional Patent Application No. 61/645,708, filed 11 May 2012 and U.S, provisional Patent Application No. 61/645,090, filed 10 May 2012, the disclosures and contents of both of which are incorporated by reference herein in their entirety.

TECHNICAL FIELD

The disclosure relates to a radio network node and to a method in a radio network node for communicating mobility parameter changes to a radio network node of another radio access technology.

BACKGROUND

3GPP Long Term Evolution (LTE) is the fourth-generation mobile communication technologies standard developed within the $3^{rd}$ Generation Partnership Project (3GPP) to improve the Universal Mobile Telecommunication System (UMTS) standard to cope with future requirements in terms of improved services such as higher data rates, improved efficiency, and lowered costs. GSM EDGE Radio Access Network (GERAN) is the radio access network in a GSM system. The Universal Terrestrial Radio Access Network (UTRAN) is the radio access network of a UMTS and Evolved UTRAN (E-UTRAN) is the radio access network of an LTE system. In a GERAN/UTRAN and an E-UTRAN, a User Equipment (UE) is wirelessly connected to a Radio Base Station (RBS) commonly referred to as a Base Transceiver Station (BTS) in GSM, as a NodeB (NB) in UMTS, and as an evolved NodeB (eNodeB or eNodeB) in LTE. An RBS is a general term for a radio network node capable of transmitting radio signals to a UE and receiving signals transmitted by a UE. In GSM, a Base Station Controller (BSC) controls the BTS and is connected to the Core Network. The BSC and the BTS are together called the Base Station System (BSS). In UMTS, a Radio Network Controller (RNC) controls the NodeB, and is, among other things, in charge of management of radio resources in cells for which the RNC is responsible. The RNC and its corresponding NodeBs are called the Radio Network Subsystem (RNS). The RNC is in turn also connected to the Core Network (CN). In LTE, the eNodeB manages the radio resources in the cells, and is directly connected to the CN, as well as to neighboring eNodeBs via an X2 interface.

In the discussions about Inter Radio Access Technology (IRAT) Mobility Robustness Optimization (MRO) that are currently ongoing in 3GPP RAN WG3, the following high priority use case scenarios have been chosen to be addressed as part of the Self Organizing Network (SON) Enhancements work item. These use case scenarios are summarized as follows (see R3-120390, "IRAT MRO way forward", Huawei, RAN3 #75):

Use case 1): Failure while in LTE or during a Handover (HO) to GERAN/UTRAN, and reconnection at GERAN/UTRAN due to too late HO.

Use case 2): Failure during or after a HO from GERAN/UTRAN to LTE, which is most likely due to HO failure while moving from GERAN/UTRAN, and reconnection back at GERAN/UTRAN which is the source Radio Access Technology (RAT). The reconnection may be at a different cell than the source one. From this point on, only UTRAN will be mentioned instead of GERAN/UTRAN.

The triggering of IRAT HO from LTE to UTRAN is controlled by parameters in LTE associated with the measurement types Reference Signal Received Power (RSRP) and Reference Signal Received Quality (RSRQ). Hereinafter, these HO parameters are referred to as ho_thresh_lte, as the parameters typically are threshold values indicating whether a HO can be triggered. In current 3GPP specifications the only aspect of measurements used to trigger HOs is that RSRP and RSRQ may both be used. It is not specified whether one or the other or both shall be used. There may thus either be a threshold value controlling the triggering of a HO associated with RSRP, or a threshold value controlling the triggering of the HO associated with RSRQ. However, it is also possible for an operator to use both these threshold values for controlling the triggering of the HO, where one is associated with RSRP and the other is associated with RSRQ. One way to counter act the problem of use case 1), which is due to a too late HO from LTE to UTRAN, could be to increase the value of the threshold value(s) controlling the HO in order to trigger the HO earlier. The side effect of this action may be an increased number of unnecessary HOs, in cases when the LTE coverage is good enough but the connection is anyway handed over to UTRAN. An MRO algorithm should take this tradeoff into account to increase or decrease the threshold value(s) ho_thresh_lte. This tradeoff is illustrated in FIGS. 1a-c.

FIG. 1a illustrates the problem situation of use case 1) where the threshold value for HO to UTRAN indicated by the line 101 is set such that the HO is triggered too late, at time 103, and a Radio Link Failure (RLF) occurs, at time 104, during the HO. This problem situation may initiate an MRO procedure and the threshold value controlling the HO is increased by a certain amount of dB. FIG. 1b illustrates how the increase of the threshold value to a level indicated by the line 105 leads to a successful HO to UTRAN at time 106 as the RLF is avoided. However, FIG. 1c illustrates another situation where the increase of the threshold value leads to an unnecessary HO at time 107 as the level of the LTE signal is somewhat lower only for a short amount of time after the HO to UTRAN. The situation illustrated in FIG. 1c would probably not have resulted in any RLF even if the threshold value would have been set such that the HO would have been avoided.

The triggering of IRAT HO from UTRAN to LTE is controlled by other HO parameters in UTRAN, which in this document are referred to as ho_thresh_utran. In the example case described herein, ho_thresh_utran and ho_thresh_lte are two different thresholds in the two different RATs. However, the thresholds both relates to the same signal, i.e. in this case an LTE signal. Therefore UTRAN configures the UE to measure RSRP, RSRQ or RSRP and RSRQ on the signal of a neighbour LTE cell. However, in another example the thresholds could both be related to measurements on a UTRAN signal, and the UE could be configured to measure e.g. the Received Signal Code Power (RSCP), the Received Signal Strength Indicator (RSSI), and the Ec/No defined as RSCP/RSSI instead. The problems of use case 2) described above, due to too early HOs from UTRAN to LTE, may be counteracted by increasing the value of the threshold value(s) ho_thresh_utran in order to trigger HO to LTE only when the signal is strong enough to retain the connection in LTE. However, if this threshold value is set too high, the side effect of this action may be that the UE stays an unnecessarily long time in UTRAN, i.e. that the UE is kept in UTRAN although there is enough LTE coverage for a successful HO. An MRO algorithm should also take this second tradeoff into account and increase or decrease the threshold value(s) ho_thresh_utran at the UTRAN side. This second tradeoff is illustrated in FIGS. 2a-c.

FIG. 2a illustrates the problem situation of use case 2) where the threshold value for HO from UTRAN to LTE indicated by the line 201 is set such that the HO is triggered too early at time 202 and a Radio Link Failure (RLF) occurs after the HO at time 203. This problem situation may initiate an MRO procedure and the threshold value(s) controlling the HO is increased by a certain amount of dB. FIG. 2b illustrates how the increase of the threshold value to the level indicated by line 204 leads to that the UE is successfully kept in UTRAN and the RLF is thus avoided. However, FIG. 2c illustrates another situation where the increase of the threshold value(s) leads to that the UE is kept unnecessarily in UTRAN even though the LTE coverage is good enough for a HO.

The occurrence of both issues described above, i.e. the too late HO and the unnecessary HO, may be monitored via statistics from unnecessary HO indicators and RLF reports. Reports about unnecessary HOs are made available in LTE thanks to a function described in TS 48.018 version 11.0.0, section 11.3.115, TS 36.413 version 11.0.0, section B.1 and TS 25.413 version 11.0.0, section 9.2.1.96. The function relies on UE measurements configuration and a RAN Information Management (RIM) message sent from UTRAN to LTE. Such RLF reports must be available in the nodes running MRO. However, it is currently being discussed in 3GPP if, when, and how these reports will be available in LTE and/or UTRAN (see R3-120390, "IRAT MRO way forward", Huawei, RAN3 #75).

Current work in 3GPP is focusing on solutions to improve mobility robustness and to avoid repeated back and forth HOs between different RATs. Such solutions are based on the identification of a mobility problem, this being a failure during mobility or repeated mobility between different RATs. However, these solutions do not take into account the consequences of adjusting mobility settings in one RAT without coordinating such adjustments in all other neighboring RATs.

Indeed, if mobility settings are changed in one RAT for the purpose of modifying mobility policies for triggering HOs towards other RATs, then equivalent and opportune changes need to be applied to neighbor RATs. The latter is to ensure a balanced system, where mobility between RATs is not subject to failures nor is too frequent or seldom.

WO2011/131225 discloses a method for reducing unnecessary HOs between cells of different RATs, based on the distribution of mobility information across various cells of different RATs. Mobility information comprises the threshold values controlling the HO. It is claimed that the threshold values may thus be configured and automatically optimized in a de-centralized way so that manual configurations and adjustments are reduced. By sending HO parameters controlling the HO from a first RAT to a second RAT from a base station in the first RAT to neighboring base stations in the second RAT, the base stations of the second RAT may make improved HO decisions e.g. avoiding ping-pong effects.

SUMMARY

As explained in the background session, it is up to the operator to decide to what measurement type the threshold value should be associated to. Furthermore, it is also possible for the operator to use more than one threshold value respectively associated with more than one measurement type. The ho_thresh_lte may e.g. comprise a threshold value associated with RSRP, a threshold value associated with RSRQ, or two threshold values associated with RSRP and RSRQ respectively. Therefore, the sending of the threshold value(s) to the neighboring base stations cannot be unambiguously understood by the receiving base station and can thus not be used to make opportune adjustments in the neighbor RAT.

It is therefore an object to address at least some of the problems addressed above, and to improve the exchange of mobility information between base stations of different RATs to avoid adjustments of HO parameters that are suboptimal or incorrect.

In accordance with a first aspect of embodiments, a method in a first radio network node of a first RAT, for communicating mobility parameter changes to a second radio network node of a second RAT is provided. The method comprises determining an updated value of a first threshold controlling when a handover to the second RAT is triggered. The method also comprises sending information related to the updated value of the first threshold to the second radio network node, wherein the information comprises an indication of a type of a measurement associated with the first threshold.

In accordance with a second aspect of embodiments, a first radio network node of a first RAT is provided. The first radio network node is configured to communicate mobility parameter changes to a second radio network node of a second RAT. The first radio network node comprises a processing circuit configured to determine an updated value of a first threshold controlling when a handover to the second RAT is triggered. The first radio network node also comprises a communication unit configured to send information related to the updated value of the first threshold to the second radio network node. The information comprises an indication of a type of a measurement associated with the first threshold.

An advantage of embodiments is that the inter-RAT MRO parameter exchange mechanisms described herein helps preventing inter-RAT ping pong by making sure that neighboring cells that belong to different RAT have up to date information about the thresholds being used to trigger inter-RAT HO.

A further advantage of embodiments is that it is ensured that threshold values exchanged between radio network nodes of different RATs are correctly interpreted in all RATs such that the adjustment of HO parameters is optimal.

Other objects, advantages and features of embodiments will be explained in the following detailed description when considered in conjunction with the accompanying drawings and claims.

BRIEF DESCRIPTION OF THE DRAWINGS

FIGS. 2a-c illustrates schematically the tradeoff between too early HO and UEs that stay unnecessarily long time in UTRAN.

DETAILED DESCRIPTION

In the following, different aspects will be described in more detail with references to certain embodiments of the invention and to accompanying drawings. For purposes of explanation and not limitation, specific details are set forth, such as particular scenarios and techniques, in order to provide a thorough understanding of the different embodiments. However, other embodiments that depart from these specific details may also exist.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while embodiments of the invention are primarily described in the form of a method and a node, they may also be embodied in a computer program product as well as in a system comprising a computer processor and a memory coupled to the processor, wherein the memory is encoded with one or more programs that may perform the functions disclosed herein.

Embodiments are hereinafter described in a non-limiting general context in relation to an example scenario where HO parameters used in an LTE system and/or HO parameters used in a UTRAN are adjusted e.g. based on an MRO procedure. However, it should be noted that the embodiments may be applied to other types of RATs and networks using other types of HO parameters or threshold values.

The technology disclosed herein addresses the problem of balancing mobility between different RATs in a system where mobility parameter settings are modified for the purpose of mobility robustness and ping pong avoidance. Some problems have been identified as not yet being addressed by 3GPP. One problem concerns where the MRO should be located or performed. Two general alternatives are possible: The MRO may be located only in LTE, or both in LTE and in UTRAN. This is an important issue since the parameters ho_thresh_lte and ho_thresh_utran must be tuned in both LTE and UTRAN to optimize the two use cases described above.

Furthermore, there is the problem of the use of threshold values associated to different measurement types in e.g. LTE. It is not specified that it is always a threshold value associated with RSRP that triggers a HO to UTRAN. It may as well be a threshold value associated with RSRQ, or two threshold values associated with RSRP and RSRQ respectively.

Figure 1A:
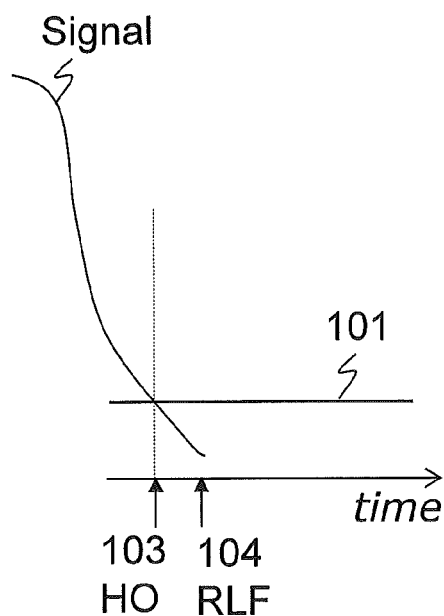
FIGS. 1a-c illustrates schematically the tradeoff between too late HOs and unnecessary HOs from LTE to UTRAN.
Figure 1B:
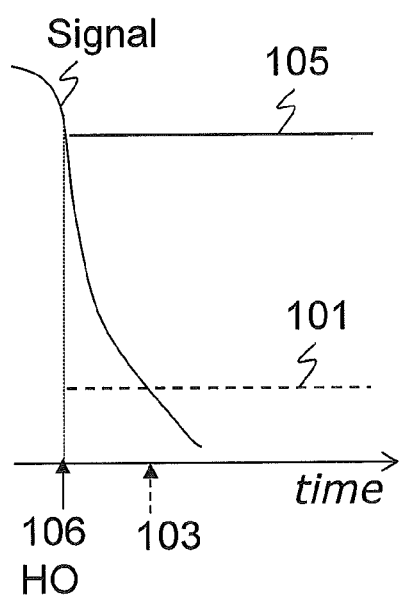
Figure 1C:
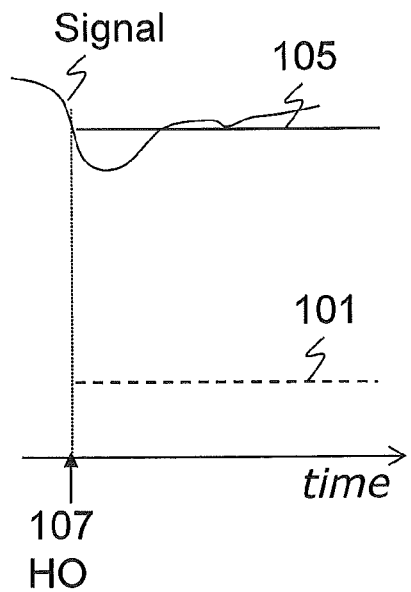

Another associated problem is the impact caused by only tuning the parameters in one of the RATs if MRO is placed in only one RAT. The problem includes the case of mobility settings changes to avoid Inter RAT ping pong. A function is currently developed in 3GPP RAN3 that is aiming at avoiding ping pong HOs between different RATs. If mobility settings are not opportunely balanced across the RATs involved in the IRAT Ping Pong avoidance the problems shown in FIG. 1c and FIG. 2c may occur. The following is a description of the impact of tuning the HO parameters only in one of the RATs for two different example cases—Case1 and Case2.

Case 1: ho_thresh_lte is Only Optimized in LTE, at the eNodeB

If it is assumed that MRO increases the threshold ho_thresh_lte, the gap to its symmetric threshold in UTRAN will be reduced and IRAT HO ping pongs may occur. IRAT HO ping-pongs are defined as follows in R3-120400, "The way forward for Inter-RAT ping-pong", NSN, Huawei, RAN3 #75:

"In inter RAT mobility, a ping pong HO is understood as a hand over from a source cell in a source RAT (A) to a target cell in a target RAT (B) different from the source RAT, and where the UE is being handed over back to a cell in the source RAT (A) within a "definable limited time."

Figure 3:
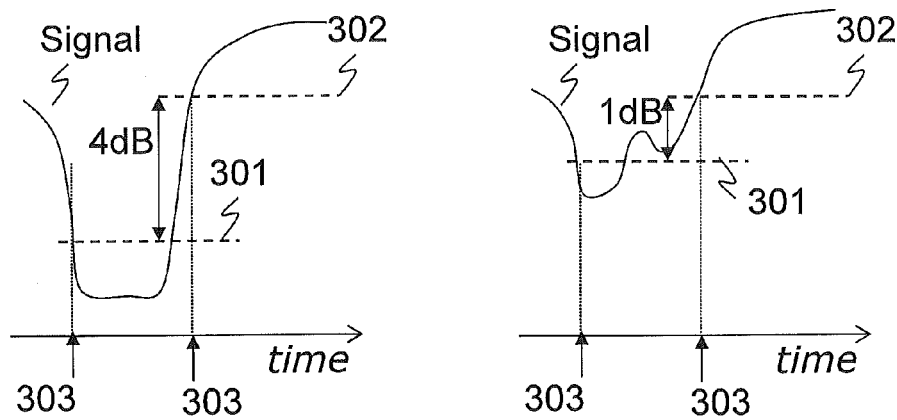
FIG. 3 illustrates schematically how an increase of only ho_thresh_lte may cause IRAT HO ping pongs.

The impact is illustrated in FIG. 3 where the difference between the threshold parameter in UTRAN 302 and the threshold parameter in LTE 301, i.e. DELTA=ho_thresh_utran−hothresh_lte, goes from 4 dB to 1 dB. When DELTA is 4 dB as on the left hand side of the figure, larger fluctuations of the signal are needed to trigger a HO 303. However, the lowered DELTA on the right hand side of the figure will result in that a small signal fluctuation can lead to IRAT HO ping pong, with HOs 303 back and forth between the RATs.

Figure 4:
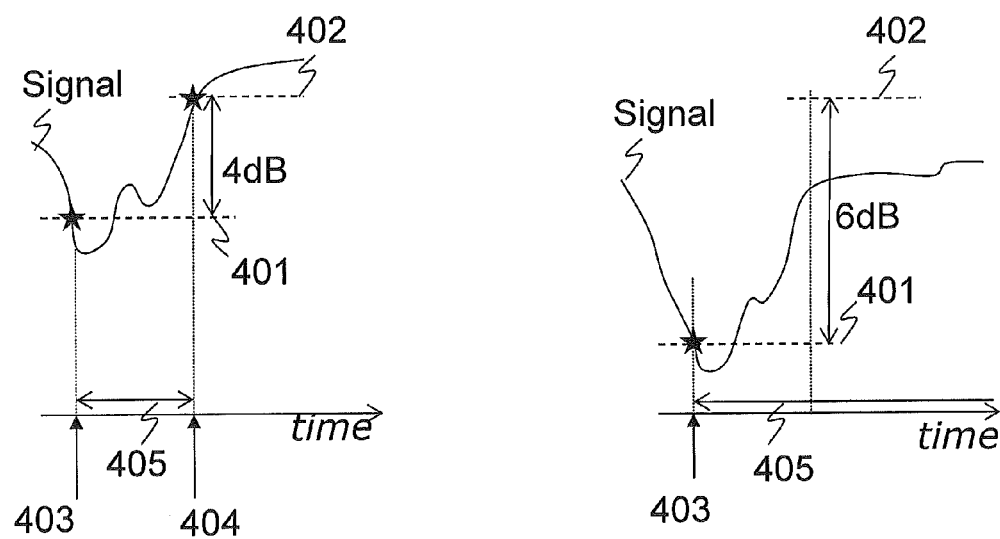
FIG. 4 illustrates schematically how a decrease of only ho_thresh_lte may affect the UE time in UTRAN.

On the other hand, if it is assumed that as a result of MRO, ho_thresh_lte 401 is decreased at the eNodeB, the difference between the threshold parameter in UTRAN 402 and the threshold parameter in LTE 401 will be increased and the UE may stay an unnecessarily long time 405 in UTRAN as illustrated in FIG. 4. On the left hand side of the figure the DELTA is 4 dB, and the signal characteristics triggers a HO to UTRAN in 403 and back to LTE in 404, thus resulting in a limited period of time 405 in UTRAN. On the right hand side of the figure, the DELTA is 6 dB and the signal characteristic makes the UE HO to UTRAN in 403 but no HO back to LTE is triggered thus making the UE stay in UTRAN for a long period of time. The unnecessarily longer time in UTRAN has not been addressed by 3GPP as a problem in the discussions since the focus has been on retainability. However, such integrity issues may become more important in the future.

Case 2: ho_thresh_utran is Only Optimized in UTRAN

Similarily to the above case, if the MRO runs only on the UTRAN side and if the threshold ho_thresh_utran is optimized by increasing its value, connections which could have been handed over to LTE would stay longer in UTRAN due to an enlargement of DELTA. The latter is a problem if the operator's policy is that of moving UEs to LTE as soon as possible. Such imbalanced network may trigger activation of unnecessary IRAT avoidance, which is aimed at re-establishing the right balance between neighbor RATs. However, the unnecessary IRAT avoidance feature implies configuration of IRAT measurements for the UEs moving from LTE to UTRAN. IRAT measurements are costly in terms of radio resources and drop in UE performance and should be reduced to the minimum.

Furthermore, if the threshold ho_thresh_utran is decreased, IRAT HO ping pongs UTRAN-LTE-UTRAN may occur.

In summary, based on cases 1 and 2, it can be seen that independently of where MRO is run, i.e. either in LTE, or in UTRAN or in both LTE and UTRAN, there is a need of some parameter tuning coordination in UTRAN and LTE in order to:

i) Avoid IRAT HO ping pongs in both directions LTE-UTRAN-LTE or UTRAN-LTE-UTRAN; and
ii) Avoid connections to stay longer in UTRAN than necessary.

The description of the problems, scenarios and solutions herein refer only to a particular instance of the problem occurrence, i.e. the case of ping pong from LTE to UTRAN and back. This shall not restrict the use of the principles behind the proposed solutions to other scenarios involving different source or target RATs.

Embodiments of the invention comprise a procedure using messages exchanged between LTE and UTRAN to notify the other RAT when a setting of a mobility parameter has been changed or is going to be changed. This notification is performed via a RIM protocol, which is described in 3GPP TS 48.018, version 10.5.0 section 8c.1.1.

The RIM procedures support the exchange of information, via the core network, between peer application entities located in a GERAN, in a UTRAN or in an E-UTRAN access network. The RIM function is performed through the interaction of the RIM protocol, allowing the exchange of the information between two BSSs or between a BSS and an RNS or between a BSS and a eNodeB transparently through the CN, and the application part on the top of the RIM protocol. The packet data units conveying RAN information between two RIM entities are including containers that shall not be interpreted by the core network nodes. The exchange of information is triggered by the application. The support of different applications is achieved by the appropriate definition of specific application containers for those applications.

In one embodiment, the RIM message encapsulates a report which contains relevant information in order to enable the other RAT to make proper adjustments to avoid the problems caused by a mismatching between symmetric parameters in different RATs. The content of this report may have different formats depending on the different scenarios concerning where the MRO algorithms should run.

An alternative embodiment could be to propagate a message similar to the Mobility Change Request, which contains the mobility parameters changed in sending node.

In the following, three example scenarios (scenario 1-3) concerning where the MRO algorithms are run are described. Also the corresponding respective different formats of the reports of the RIM message (format 1-3) are described.

Scenario 1: MRO Runs Only at LTE—Format 1

Scenario 1 is in line with a solution where all information is only available in LTE. In this scenario, it is proposed that the MRO function in LTE decides the parameters settings for both ho_thresh_lte and ho_thresh_utran. When the changes are decided, a report with the recommended value for ho_thresh_utran is generated and sent to the UTRAN via a RIM Transfer Request. Note that the changes for the UTRAN system may either be in absolute terms or in relative terms, i.e. incremental or decremental with respect to current IRAT mobility or HO thresholds used. UTRAN receives the report and shall notify LTE if the recommended changes were performed. Since the assumption is that there is no MRO algorithm at the UTRAN, there are only two possible response messages associated to acceptance or rejection. The response message is also sent via RIM together with other relevant information to enable LTE to re-run MRO.

Scenario 2: Independent MRO Run at LTE and UTRAN—Format 2

Scenario 2 is in line with a solution where information is made available in both LTE and UTRAN. If the RLF reports and other indicators are made available in both RATs, both LTE and UTRAN may run independent MRO algorithms. In this case MRO in LTE may decide parameters settings for ho_thresh_lte to handle the tradeoff described with reference to FIG. 1c, and UTRAN may decide the settings for ho_thresh_utran independently to handle the tradeoff described with reference to FIG. 2c.

When LTE decides a new value for ho_thresh_lte, the changes are immediately performed and a report is generated with info about this change and sent to the UTRAN via RIM. Differently from format 1, the report does not contain any recommendation about ho_thresh_utran. Upon the reception of the report, UTRAN does not notify LTE and it may choose how to use the reported information in its own MRO algorithm. E.g. the UTRAN may store this report in a buffer and use it as input to the next iteration of its MRO algorithm, or simply discard the info.

Scenario 3: Coordinated MRO Run at LTE and UTRAN—Format 3

Scenario 3 is in line with a solution where information is made available in both LTE and UTRAN. In this case each RAT runs the same MRO algorithm. It is assumed that LTE collects enough statistics. Then, MRO may decide for a change in ho_thresh_lte and/or ho_thresh_utran. When any change is decided, eNodeB sends a Format 3 Report to UTRAN with its old settings, its new settings and a recommended value for ho_thresh_utran. The changes recommended for the UTRAN system may either be in absolute terms or in relative terms, i.e. incremental or decremental with respect to current IRAT mobility thresholds used.

When UTRAN receives the report it performs the change in ho_thresh_utran and sends an ACK to the eNodeB. Upon the reception of the ACK, eNodeB performs its change to ho_thresh_lte.

Similarly, when UTRAN collects enough statistics, such as RLF reports and other indicators, it may trigger MRO and propose changes in ho_thresh_lte and/or ho_thresh_utran. Then, a Format 3 Report is sent to the eNodeB which performs the change and sends an ACK to the UTRAN. Upon the reception of the ACK, the changes are also performed at the UTRAN.

As described above, MRO is supposed to optimize among others the parameters ho_thresh_lte at the LTE side and ho_thresh_utran at the UTRAN side. These are, respectively, the triggering thresholds for IRAT handover from LTE to UTRAN and from UTRAN to LTE. These are based on the LTE measurements RSRP and/or RSRQ performed when the UE is connected to LTE or UTRAN.

As said earlier, embodiments of the invention comprise a procedure using RIM messages exchanged between LTE and UTRAN/GERAN to notify the other RAT that a setting of one of these parameters has been changed. The RIM message encapsulates a report which should contain relevant information in order to enable the other RAT to make proper adjustments to avoid the problems caused by a mismatch of symmetric parameters in different RATs. In the following the procedure is described in detail as well as the content of this report depending on the different scenarios.

Scenario 1: MRO runs only at LTE—Format 1

When MRO in LTE runs and decides the parameters settings for both ho_thresh_lte and ho_thresh_utran, the report Format 1 is generated with the following information, which may be included in full or in part:

TABLE 1

Report Format 1

| Parameter of the report | Description |
|---|---|
| Global Cell Identity of source cell | Cell Identity |
| Global Cell Identity of target cell | Cell Identity |

TABLE 1-continued

Report Format 1

| Parameter of the report | Description |
| --- | --- |
| Measurement Type | This specifies which threshold has to be modified. This can be RSRP, RQRQ or RSRP/RSRQ if both have to be modified. |
| Report identity | Identity for this report |
| Object relation | This specifies to which LTE/UTRAN or UTRAN/LTE pair the change is associated. E.g. LTE cell - UTRAN cell is an object pair whose objects are LTE cell and UTRAN cell. The relation in this case can be LTE cell - UTRAN cell, LTE eNodeB - RNC UTRAN, LTE frequency - UTRAN frequency, or any other relation between an LTE object and an UTRAN object. |
| Object relation identities | It depends on the object relation. If the Object relation is LTE cell - UTRAN cell, these identities can be the ECGI in LTE or the UTRAN cell identity. |
| Recommended Value(s) | Recommended value(s) for the UTRAN threshold(s) ho_thresh_utran or incremental change for ho_thresh_utran |

The report is then sent from LTE to UTRAN via a RIM Request Transfer and LTE waits a response from UTRAN. The response from UTRAN may either confirm that the change was accepted or it may confirm that the change was rejected. In the latter case, failure of implementing the suggested changes could be complemented by a range of configured values for the ho_thresh_utran, which cannot be exceeded.

TABLE 2

Successful response information acknowledgement for reception of Report 1

| Parameter of the report | Description |
| --- | --- |
| Global Cell Identity of source cell | Cell Identity |
| Global Cell Identity of target cell | Cell Identity |
| Report identity | Identity for this report |

Upon the reception of this report, UTRAN decides if the changes are accepted. In the positive case, UTRAN creates an ACK message to confirm that the changes were performed. When this message reaches LTE, MRO knows the new setting for ho_thresh_utran is the recommended one. At this point, LTE should also perform the changes for ho_thresh_lte. If the changes in UTRAN are not performed, a NACK message is also sent via RIM with the current unchanged value of ho_thresh_utran.

TABLE 3

Failure response information acknowledgement for reception of Report 1

| Parameter of the report | Description |
| --- | --- |
| Global Cell Identity of source cell | Cell Identity |
| Global Cell Identity of target cell | Cell Identity |
| Report identity | Identity for this report |
| Cause | Indicates the cause of failure to implement suggested changes. For example: changes outside configured range; handover threshold not changeable. |
| Mobility Parameters Modification Range | Indicates the range within which the handover threshold can be modified |

The NACK message may include a field explaining the reason for the NACK (for example, threshold too high or too low). The NACK message may also include a field with the highest and lowest acceptable threshold. The same principle could also be applied with an increase/decrease message. The ACK message may also contain the current changed value (for example, LTE says increase by x db, UTRAN replies with ACK saying now my threshold is y dB).

Optionally, upon the reception of a NACK, the MRO algorithm in LTE may run again to perform a sub-optimal change considering the constraint that ho_thresh_utran cannot be changed automatically.

Figure 5A:
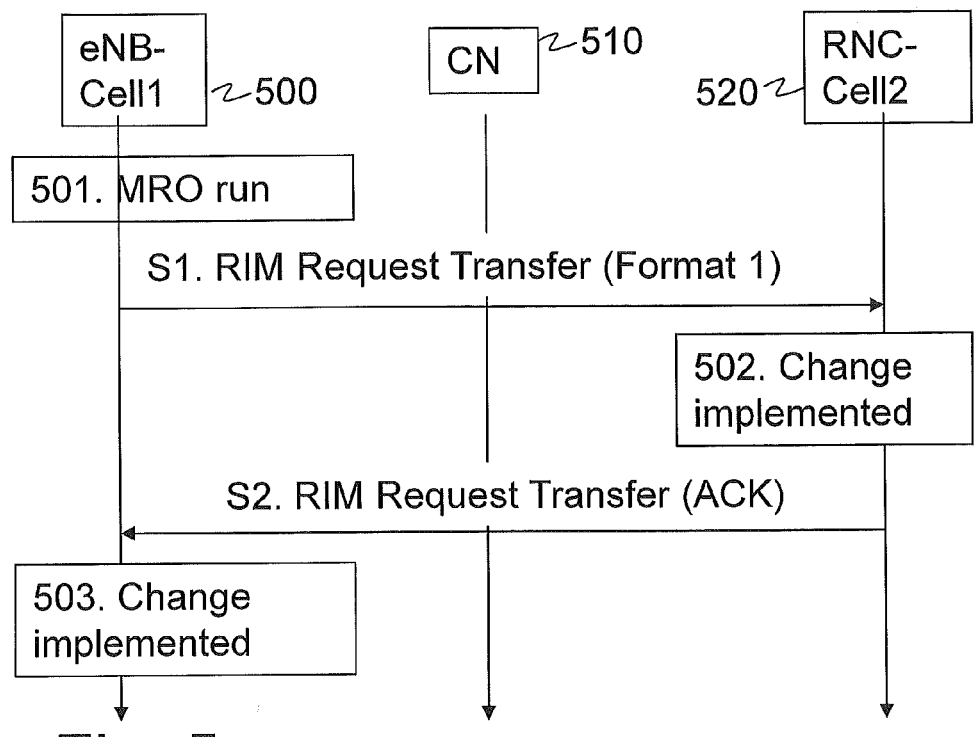
FIG. 5a is a signaling diagram schematically illustrating an embodiment according to scenario 1.

FIG. 5a is a signaling diagram schematically illustrating the actions and the signaling involved in the procedure of scenario 1, where the UTRAN accepts the changes recommended by LTE. In 501, the MRO is run in an eNodeB 500 serving Cell1 (eNB-Cell1). The output from MRO is new values for the HO parameters ho_thresh_lte and ho_thresh_utran. A report according to Report format 1 as described in Table 1 is created and is sent in a RIM Request Transfer message in S1 to an RNC 520 in UTRAN controlling Cell2 (RNC-Cell2), using RIM via the Core Network 510. The new values for the HO parameters are accepted and the changes are implemented in 502. The RNC 520 may then reply, in S2, with an acknowledgement according to the format in Table 2, encapsulated in a RIM Request Transfer message. Eventually, in 503 the eNodeB 500 performs the changes for ho_thresh_lte in response to the acknowledgement in S2.

Figure 5B:
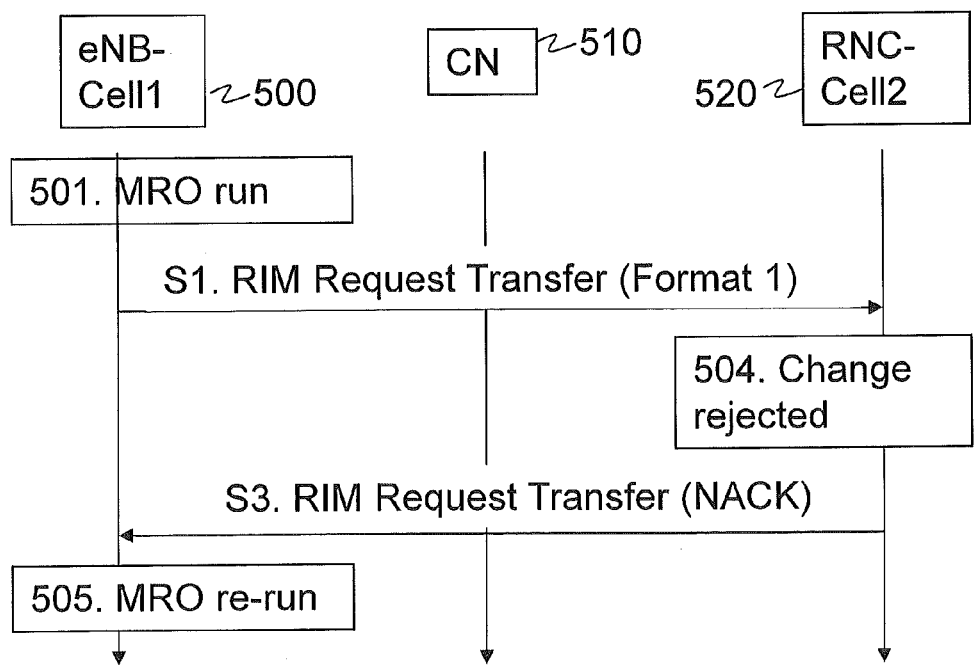
FIG. 5b is a signaling diagram schematically illustrating an embodiment according to scenario 1.

FIG. 5b is a signaling diagram schematically illustrating the actions and the signaling involved in the procedure of scenario 1, where the UTRAN rejects the recommended changes. Step 501 and S1 are the same as in FIG. 5a. However, the RNC 520 decides to reject the changes to the threshold value(s) in 504, and the reply in S3 comprises a non-acknowledgement according to the example format in Table 3. The eNodeB 500 may thus in 505 optionally re-run the MRO with e.g. a constraint that the UTRAN threshold cannot be modified outside a certain reported modification range.

The procedure may be enhanced by considering a timer when the primary RIM message is sent in S1. If the timer expires before the response, the RIM message is retransmitted a certain number of times. If it still does not receive the response, MRO assumes the change has not been performed.

Another alternative could be that MRO performs the changes in LTE before notifying UTRAN. In the case of an ACK response as in FIG. 5a, the procedure is ended. In the case of a NACK response as in FIG. 5b, the MRO algorithm has the possibility to rerun with the constraint that ho_thresh_utran cannot be modified and having as input its current unchanged value sent with the NACK response message.

Scenario 2: Independent MRO Run at LTE and UTRAN—Format 2

As described earlier, MRO in LTE can decide parameters settings for ho_thresh_lte and MRO in UTRAN may decide the settings for ho_thresh_utran independently. When ho_thresh_lte is modified by MRO running in LTE, the following report Format 2 is generated:

TABLE 4

Report Format 2 - LTE originated

| Parameter of the report | Description |
|---|---|
| Measurement Type | This specifies which threshold has been modified. Since it is generated in LTE this can be RSRP, RQRQ or RSRP/RSRQ of them if both have been modified. |
| Report identity | Identity for this report |
| Object relation | This specifies to which LTE/UTRAN pair the change is associated. E.g. LTE cell - UTRAN cell is an object pair whose objects are LTE cell and UTRAN cell. The relation in this case can be LTE cell - UTRAN cell, LTE eNodeB - RNC UTRAN, LTE frequency - UTRAN frequency, or any other relation between an LTE object and an UTRAN object. |
| Object relation identities | It depends on the object relation. If the Object relation is LTE cell - UTRAN cell, these identities can be the ECGI in LTE or the UTRAN cell identity. |
| LTE change(s) | Incremental value of how much the LTE threshold(s) ho_thresh_lte has changed or the new and the old settings. |

Upon the reception of the report, UTRAN does not notify LTE and it may choose how to use the reported information in its own MRO algorithm. E.g. the UTRAN may store this report in a buffer and use it as input to the next iteration of its MRO algorithm. Similarly, when ho_thresh_utran is modified by MRO running in UTRAN, the following report Format 2 is generated:

TABLE 5

Report Format 2 - UTRAN originated

| Parameter of the report | Description |
|---|---|
| Measurement Type | This specifies which threshold has been modified. Since it is generated in UTRAN this can be RSRP, RQRQ or RSRP/RSRQ or a combination of them if more than one has been modified. |
| Report identity | Identity for this report |
| Object relation | This specifies to which LTE/UTRAN pair the change is associated. E.g. LTE cell - UTRAN cell is an object pair whose objects are LTE cell and UTRAN cell. The relation in this case can be LTE cell - UTRAN cell, LTE eNodeB - RNC UTRAN, LTE frequency - UTRAN frequency, or any other relation between an LTE object and an UTRAN object. |
| Object relation identities | It depends on the object relation. If the Object relation is LTE cell - UTRAN cell, these identities can be the ECGI in LTE or the UTRAN cell identity. |
| UTRAN change(s) | Incremental value of how much the UTRAN threshold(s) ho_thresh_lte has changed or the new and the old settings. |

In this solution the aim is to reduce the interaction between the RATs by minimizing the interaction between the algorithms. However, the number of RIM messages exchanged may be high until convergence assuming both RATs will have access to ping pong statistics and would try to fix it by their own, increasing the gap between ho_thresh_utran and ho_thresh_lte.

Scenario 3: Coordinated MRO Run at LTE and UTRAN—Format 3

When LTE decides new settings for ho_thresh_lte it sends a Format 3 report to UTRAN:

TABLE 6

Report Format 3 - LTE originated

| Parameter of the report | Description |
|---|---|
| Measurement Type | This specifies which threshold has been modified. Since it is generated in LTE this can be RSRP, RQRQ or RSRP/RSRQ of them if both have been modified. |
| Report identity | Identity for this report |
| Object relation | This specifies to which LTE/UTRAN pair the change is associated. E.g. LTE cell - UTRAN cell is an object pair whose objects are LTE cell and UTRAN cell. The relation in this case can be LTE cell - UTRAN cell, LTE eNodeB - RNC UTRAN, LTE frequency - UTRAN frequency, or any other relation between an LTE object and an UTRAN object. |
| Object relation identities | It depends on the object relation. If the Object relation is LTE cell - UTRAN cell, these identities can be the ECGI in LTE or the UTRAN cell identity. |
| LTE change(s) | Incremental value of how much the LTE threshold(s) ho_thresh_lte has changed or the old and the new absolute values. |
| UTRAN recommended change(s) | Incremental value of how much the UTRAN threshold(s) ho_thresh_utran should be changed or the old and the new absolute values. |

When UTRAN performs a change in ho_thresh_utran it sends a similar report to LTE:

TABLE 7

Report Format 3 - UTRAN originated

| Parameter of the report | Description |
|---|---|
| Measurement Type | This specifies which threshold has been modified. Since it is generated in UTRAN this can be RSRQ, RSRP or RSRQ/RSRP or a combination of them if more than one has been modified. |
| Report identity | Identity for this report |
| Object relation | This specifies to which LTE/UTRAN pair the change is associated. E.g. LTE cell - UTRAN cell is an object pair whose objects are LTE cell and UTRAN cell. The relation in this case can be LTE cell - UTRAN cell, LTE eNodeB - RNC UTRAN, LTE frequency - UTRAN frequency, or any other relation between an LTE object and an UTRAN object. |
| Object relation identities | It depends on the object relation. If the Object relation is LTE cell - UTRAN cell, these identities can be the ECGI in LTE or the UTRAN cell identity. |
| New Value(s) ho_thresh_utran | New value(s) for the UTRAN threshold(s) ho_thresh_utran |
| UTRAN change(s) | Incremental value of how much the UTRAN threshold(s) ho_thresh_utran has changed or the old and the new absolute values. |
| LTE recommended change(s) | Incremental value of how much the LTE threshold(s) ho_thresh_lte should be changed or the old and the new absolute values. |

As described earlier, when the reports are received the recommended changes may be performed and an ACK is sent. Upon the reception of the ACK the source RAT can safely perform its change. Alternatively the source RAT can apply changes relative to its system and, depending on the reply received from neighbor RAT it can either modify or confirm changes to its own system.

The convergence herein is probably faster than scenario 2; however, it requires a higher level of interaction between the algorithms and more intelligence in both RATs. Similarly to scenario 2, MRO may perform the changes even before notifying UTRAN and vice versa.

For this case the acknowledgement message and the failure message may follow the structure of messages in Table 2 and Table 3.

As previously mentioned, all three report formats, format 1-3, comprise a Measurement Type field that specifies which threshold that has been modified. This information is important as the updated threshold value(s) received by e.g. an eNodeB in LTE from UTRAN cannot be correctly interpreted by the receiving eNodeB if it is not known what measurement type or types that the updated value corresponds to. The measurement type field is thus essential to avoid adjustments of HO parameters that are suboptimal or incorrect.

The problem is exemplified by the following situation in a scenario 2 setting. A UE served by a UTRAN cell close to the cell border measures signal levels from a target E-UTRAN cell. The measurements are used for HO decisions. The UE measures a low level for the RSRP and a high level for the RSRQ. If an MRO is run and results in that the threshold corresponding to the RSRP is increased, the HO to the E-UTRAN cell will be delayed until the measured RSRP level has increased to a "medium" level. At that point the RSRQ level may be very high. The decision to apply the mobility threshold change, shrinking the target E-UTRAN cell, may have been incorrect, as the high RSRQ level may be enough for avoiding an RLF after HO to the E-UTRAN cell. The UE may e.g. have capabilities that allow it to receive bearer traffic even if RSRP is low. The HO may thus be delayed without reason.

According to scenario 2, the incorrect decision in UTRAN to delay the HO to E-UTRAN, i.e. the increased threshold in UTRAN, is reported to E-UTRAN in order to allow for a coordinated MRO procedure in E-UTRAN. If there is no indication of the measurement type associated with the threshold that has been amended, the MRO in E-UTRAN cannot make an accurate decision based on the information. If accepting the threshold change, a corresponding change will be performed in E-UTRAN such that UEs served by the E-UTRAN cell will perform HO to the UTRAN cell earlier than actually needed as well. However, if a measurement type is indicated together with the information about the changed threshold, the MRO in E-UTRAN can reject the change made by UTRAN in order to get a more accurate HO decision. For example, if E-UTRAN knew that the threshold change in UTRAN was made on the bases of RSRP, it could decide not to follow the change in UTRAN with a change in LTE. This would at least allow UEs in LTE to stay connected to LTE for longer. Further, the eNB could decide to send a message in format 2 to the RNC in UTRAN, where a change in RSRQ is indicated (the change could also be of a zero delta). This message can be interpreted by UTRAN as an indication that the measurement type in LTE is RSRQ and that alignment of message types is needed.

Method and Radio Network Node Illustrated in FIGS. 6*a-c*, 7 and 8

Figure 6A:
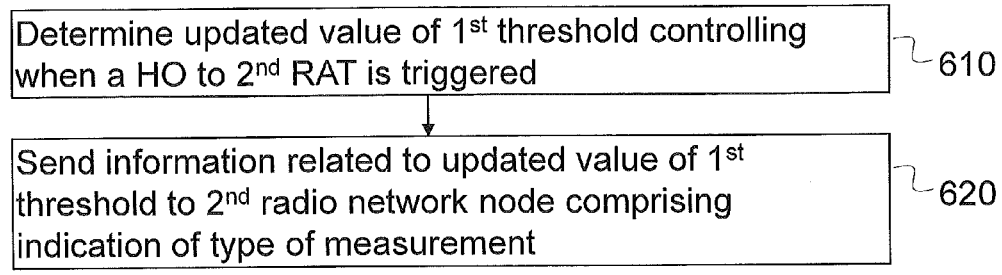
FIGS. 6a-c are flowcharts schematically illustrating a method in a radio network node according to embodiments.

FIG. 6*a* is a flow chart schematically illustrating a method in a first radio network node 710 of a first RAT, for communicating mobility parameter changes to a second radio network node 720 of a second RAT. The first radio network node may e.g. be an eNodeB in E-UTRAN, and the second radio network node may be an RNC in UTRAN. The method may be used e.g. as described for scenario 2 and 3 above. The method comprises:

610: Determining an updated value of a first threshold controlling when a handover to the second RAT is triggered. In one embodiment, the updated value of the first threshold is determined based on an optimization algorithm, such as an MRO algorithm.

620: Sending information related to the updated value of the first threshold to the second radio network node. The information comprises an indication of a type of a measurement associated with the first threshold. The first threshold may e.g. be the ho_thresh_utran described in the example scenario above, and the indication of the type of measurement associated with ho_thresh_utran may e.g. be RSRP, RSRQ, or both. The information related to the updated value of the first threshold may optionally comprise an indication of an object relation to which the updated value of the first threshold is associated. The object relation may comprise a relation between an object of the first RAT and an object of the second RAT. Each of said objects may be one of a frequency, a cell, a radio network node, or a RAT.

Figure 6B:
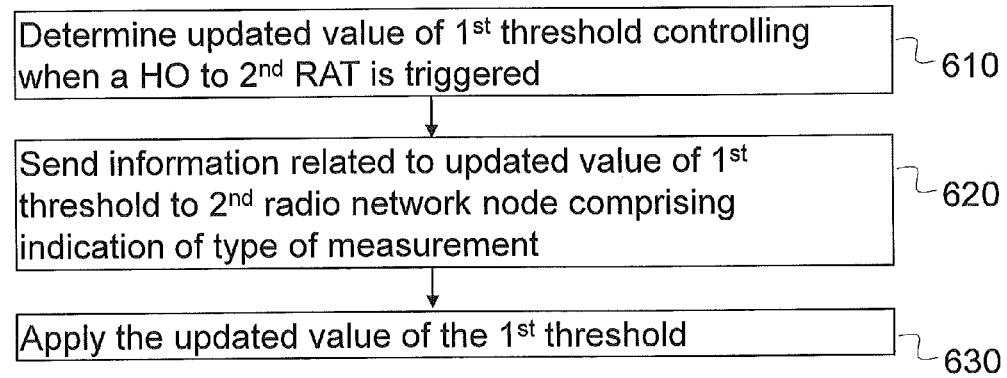

FIG. 6*b* is a flow chart schematically illustrating the method in the first radio network node 710 according to another embodiment. This embodiment is exemplified by scenario 2 described above, where MRO is run independently in the RATs. The method comprises:

610: Determining an updated value of a first threshold controlling when a handover to the second RAT is triggered.

620: Sending information related to the updated value of the first threshold to the second radio network node. The information comprises an indication of a type of a measurement associated with the first threshold.

630: Applying the updated value of the first threshold.

Figure 6C:
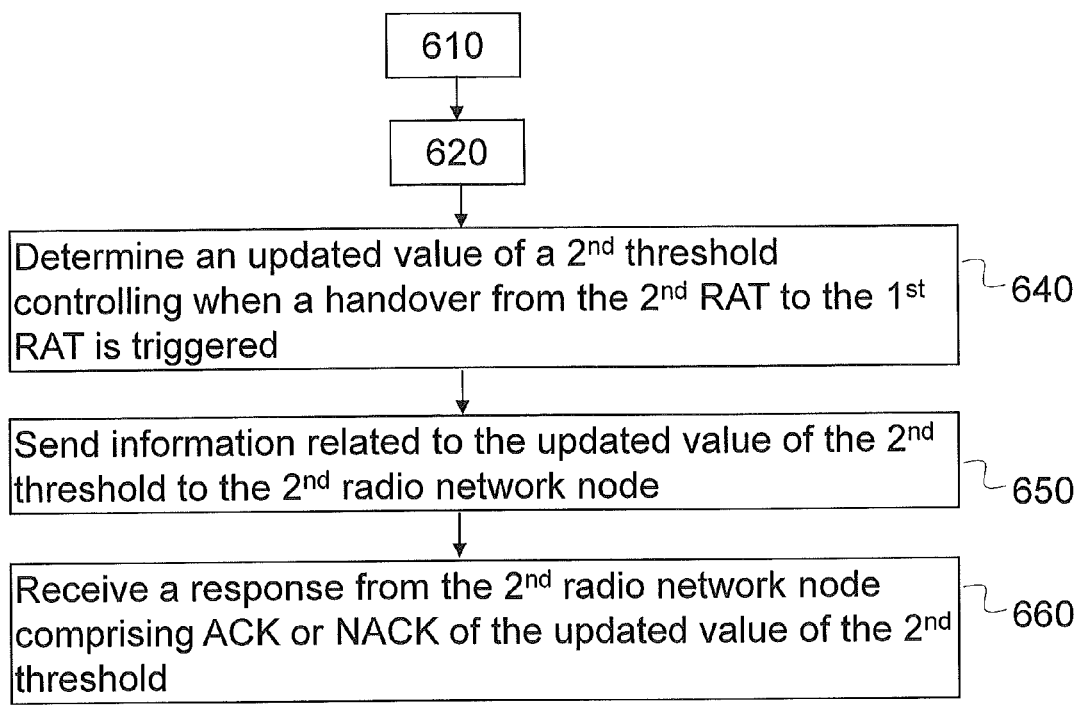

FIG. 6*c* is a flow chart schematically illustrating the method in the first radio network node 710 according to still another embodiment. This embodiment is exemplified by scenario 3 described above, with coordinated MRO procedures. The method comprises:

610: Determining an updated value of a first threshold controlling when a handover to the second RAT is triggered.

620: Sending information related to the updated value of the first threshold to the second radio network node. The information comprises an indication of a type of a measurement associated with the first threshold.

640: Determining an updated value of a second threshold controlling when a handover from the second RAT to the first RAT is triggered.

650: Sending information related to the updated value of the second threshold to the second radio network node. The information comprises an indication of a type of a measurement associated with the second threshold.

660: Receiving a response from the second radio network node, the response comprising an acknowledgement or a non-acknowledgement of the updated value of the second threshold. The response comprising a non-acknowledgement of the updated value of the second threshold, may also comprise at least one of: a cause of failure to implement the updated value of the second threshold; and a range of acceptable values of the updated value of the second threshold.

When the received response comprises a non-acknowledgement according to one alternative of step 660, the method may further comprise determining new updated values of at least one of the first and the second threshold based on the received response.

In one embodiment, the updated value of the first threshold is applied only when the received response comprises an acknowledgement. In an alternative embodiment, the updated value of the first threshold is applied prior to sending the information related to the updated value of the second threshold to the second radio network node. When the received response is an acknowledgement, the applied updated value of the first threshold may thus be confirmed.

In any of the embodiments described with reference to FIG. 6*c*, the method may optionally further comprise the initial step of receiving information related to values of the first and/or second thresholds from the second radio network node, where the received information comprises an indication of a type of a measurement associated with the first and/or second threshold. The received information may be used as input for determining the updated value of the first threshold.

Figure 7:
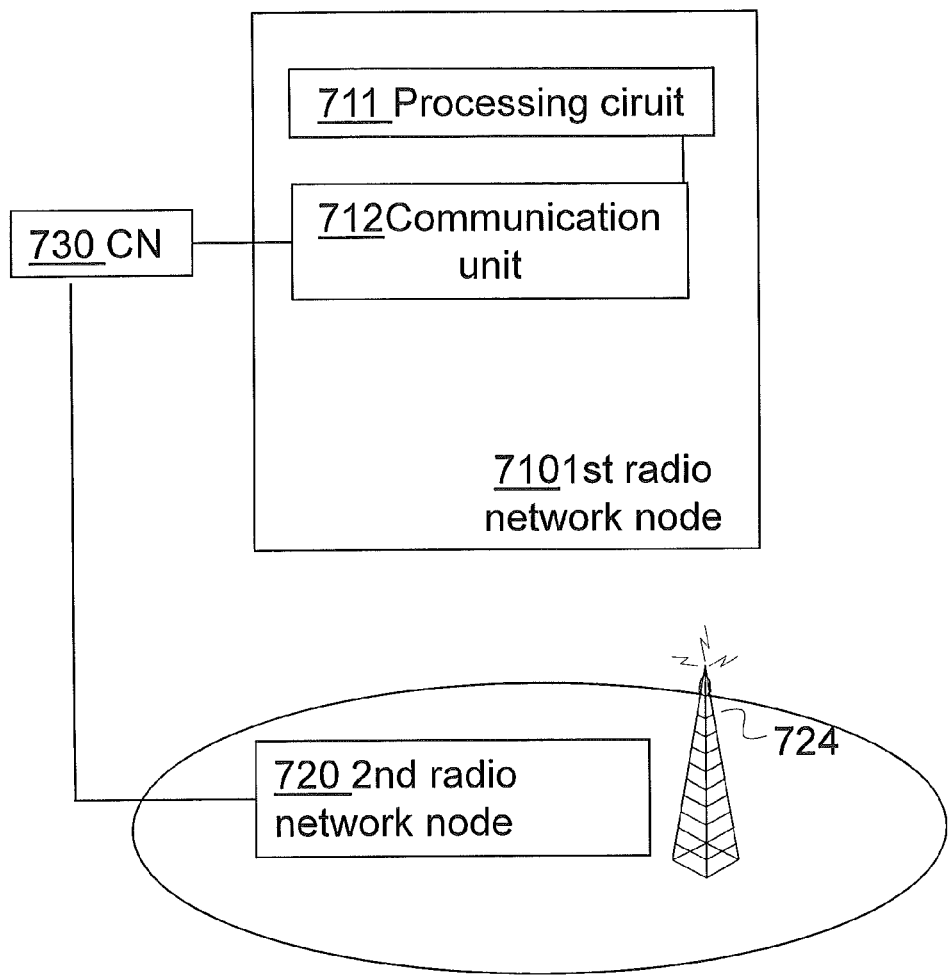
FIG. 7 is a block diagram schematically illustrating a radio network node according to embodiments.

A first radio network node 710 of a first RAT is schematically illustrated in the block diagram in FIG. 7, according to one embodiment. The first radio network node 710 is configured to communicate mobility parameter changes to a second radio network node 720 of a second RAT. The first radio network node may e.g. be an RNC in UTRAN, and the second radio network node may be an eNodeB in E-UTRAN. The second radio network node may thus be connected to one or more antennas 724 via a radio transceiver. The first radio network node 710 comprises a processing circuit 711 configured to determine an updated value of a first threshold controlling when a handover to the second RAT is triggered. The processing circuit 711 may be configured to determine the updated value of the first threshold based on an optimization algorithm. The first radio network node 710 also comprises a communication unit 712, connected to the processing circuit 711 and configured to send information related to the updated value of the first threshold to the second radio network node 720. The information comprises an indication of a type of a measurement associated with the first threshold. The communication unit 712 may e.g. use the RIM protocol to communicate with the second radio network node via the Core Network 730. The information related to the updated value of the first threshold may optionally also comprise an indication of an object relation to which the updated value of the first threshold is associated, where the object relation comprises a relation between an object of the first RAT and an object of the second RAT. Each of said objects may be one of a frequency, a cell, a radio network node, or a RAT. The processing circuit 711 may be further configured to apply the updated value of the first threshold.

In another embodiment, the processing circuit 711 may be further configured to determine an updated value of a second threshold controlling when a handover from the second RAT to the first RAT is triggered. The communication unit 712 may be further configured to send information related to the updated value of the second threshold to the second radio network node, wherein the information comprises an indication of a type of a measurement associated with the second threshold. Furthermore, the communication unit 712 may be further configured to receive a response from the second radio network node. The response may comprise an acknowledgement or a non-acknowledgement of the updated value of the second threshold. The response comprising a non-acknowledgement of the updated value of the second threshold may also comprise at least one of: a cause of failure to implement the updated value of the second threshold; and a range of acceptable values of the updated value of the second threshold. The processing circuit 711 may be further configured to determine new updated values of at least one of the first and the second threshold based on the received response, when the received response comprises a non-acknowledgement. In one embodiment the processing circuit 711 may be configured to apply the updated value of the first threshold only when the received response comprises an acknowledgement. In another embodiment, the processing circuit 711 may be configured to apply the updated value of the first threshold prior to sending the information related to the updated value of the second threshold to the second radio network node. The processing circuit 711 may be further configured to confirm the applied updated value of the first threshold when the received response is an acknowledgement.

In one embodiment, the communication unit 712 may be further configured to receive information related to values of the first and/or second thresholds from the second radio network node, and wherein the received information is used as input for determining the updated value of the first threshold. The received information may comprise an indication of a type of a measurement associated with the first and/or second threshold.

In view of the above discussion, it will be appreciated that embodiments of the above-described embodiments of the invention include methods performed at one or more radio network nodes in a network, such as at an LTE eNodeB, for coordinating mobility settings with a radio network node of another RAT. Various instances of these methods may also include steps communicating data from one node to another, again for the purpose of coordinating mobility settings. It will also be appreciated that the several techniques described above, as well as their sub-processes, can be used in any combination unless it is obvious that that those techniques or sub-processes are inherently incompatible with one another. Other embodiments include radio network node apparatus, such as an eNodeB or an RNC, corresponding to the methods and techniques described above.

Figure 8:
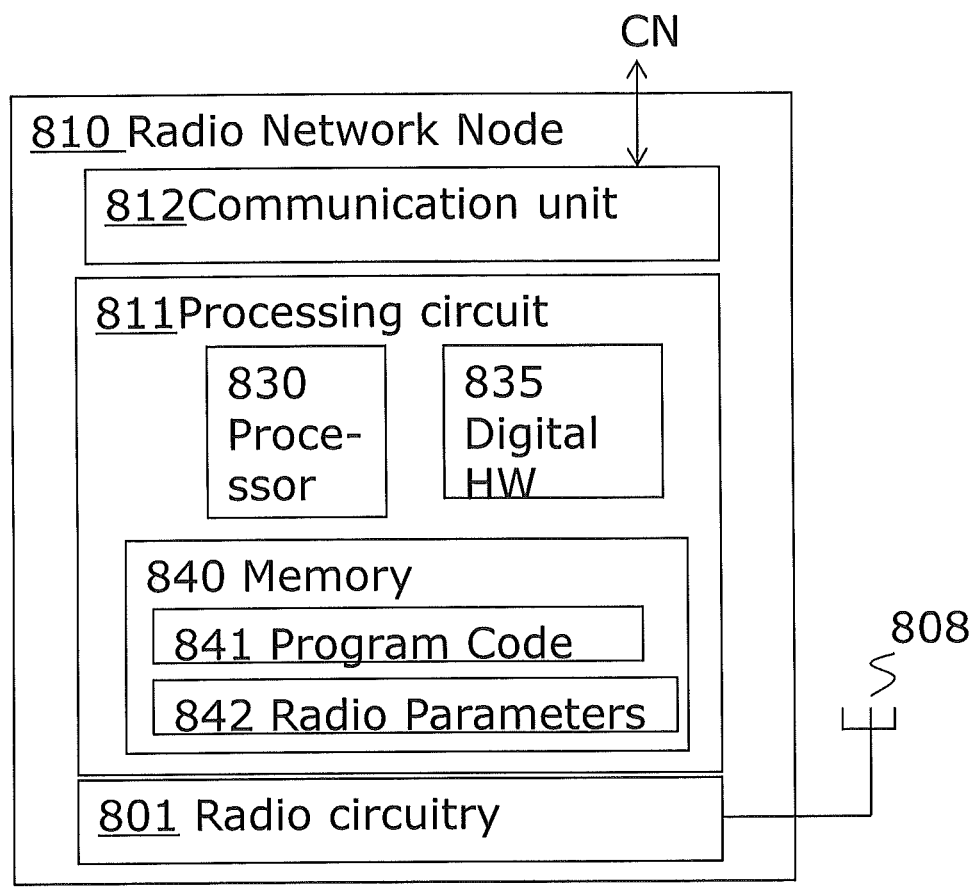
FIG. 8 is a block diagram schematically illustrating a radio network node according to embodiments.

In some cases, the methods described above will be implemented in a wireless transceiver apparatus such as the one pictured in FIG. 8, which illustrates a few of the components relevant to the present techniques, as realized in an RBS. Of course, it will be appreciated that a network-based implementation need not be limited to an RBS implementation, thus other radio network node apparatus configured to carry out the techniques described above are also possible.

The apparatus 810 in FIG. 8 is configured to coordinate mobility settings with a radio network node of another RAT. The apparatus comprises a communicating unit 812 configured to communicate with the radio network node of the other RAT via the CN. The apparatus illustrated in FIG. 8 includes radio circuitry 801 and processing circuitry 811. Radio circuitry 801 includes receiver circuits and transmitter circuits that use known radio processing and signal processing components and techniques, typically according to a particular telecommunications standard such as the 3GPP standard for LTE. The receiver and transmitter circuits are connected via an antenna port to one or more antennas 808. Because the various details and engineering tradeoffs associated with the design of such circuitry are well known and are unnecessary to a full understanding of the invention, additional details are not shown here.

The processing circuitry 811, the communicating unit 812, and the radio circuitry 801 described above with reference to FIG. 8 may be logical units, separate physical units or a combination of both logical and physical units.

Processing circuitry 811 includes one or more microprocessors 830 or microcontrollers, as well as other digital hardware 835, which may include Digital Signal Processors (DSPs), special-purpose digital logic, and the like. Either or both of microprocessor(s) 830 and digital hardware 835 may be configured to execute program code 841 stored in memory 840, along with radio parameters 842. Again, because the various details and engineering tradeoffs associated with the design of processing circuitry for RBSs are well known and are unnecessary to a full understanding of the invention, additional details are not shown here The program code 841 stored in memory circuit 840, which may comprise one or several types of memory such as read-only memory (ROM), random-access memory, cache memory, flash memory devices, optical storage devices, etc., includes program instructions for executing one or more telecommunications and/or data communications protocols, as well as instructions for carrying out one or more of the techniques described herein, in several embodiments. Radio parameters 842 may include one or more pre-determined tables or other data for supporting these techniques, in some embodiments.

Examples of several embodiments of the present invention have been described in detail above, with reference to the attached illustrations of specific embodiments. Because it is not possible, of course, to describe every conceivable combination of components or techniques, those skilled in the art will appreciate that the present technology may be implemented in other ways than those specifically set forth herein, without departing from essential characteristics of the invention.

ABBREVIATIONS

3GPP 3rd Generation Partnership Project
CN Core Network
ECGI E-UTRAN Cell Global Identifier
UTRAN Universal Terrestrial Radio Access Network
GERAN GSM EDGE Radio Access Network
HO Hand Over
MRO Mobility Robustness Optimization
IRAT inter-RAT
LTE Long Term Evolution
RAT Radio Access Technology
eNodeB evolved NodeB
RIM Radio Access Network Information Management
RNC Radio Network Controller
UE User Equipment
RSRP Reference Signal Received Power
RSRQ Reference Signal Received Quality

The invention claimed is:

1. A method in a first radio network node of a first radio access technology, for communicating mobility parameter changes to a second radio network node of a second radio access technology, the method comprising:
   determining an updated value of a first threshold controlling when a handover to the second radio access technology is triggered;
   sending information related to the updated value of the first threshold to the second radio network node, wherein the information comprises an indication of a type of a measurement associated with the first threshold;
   determining an updated value of a second threshold controlling when a handover from the second radio access technology to the first radio access technology is triggered;
   sending information related to the updated value of the second threshold to the second radio network node; and
   receiving a response from the second radio network node, the response comprising an acknowledgement or a non-acknowledgement of the updated value of the second threshold,
   wherein the non-acknowledgment comprises at least one of: a cause of failure to implement the updated value of the second threshold, or a range of acceptable values of the updated value of the second threshold.

2. The method according to claim 1, wherein the updated value of the first threshold is determined based on an optimization algorithm.

3. The method according to claim 1, wherein the information related to the updated value of the first threshold comprises an indication of an object relation to which the updated value of the first threshold is associated, the object relation comprising a relation between an object of the first radio access technology and an object of the second radio access technology, wherein each of said objects is one of a frequency, a cell, a radio network node, or a radio access technology.

4. The method according to claim 1, further comprising:
   applying the updated value of the first threshold.

5. The method according to claim 1,
   wherein the information related to the updated value of the second threshold comprises an indication of a type of a measurement associated with the second threshold.

6. The method according to claim 1, further comprising:
   responsive to the received response comprising a non-acknowledgement, determining new updated values of at least one of the first or the second threshold based on the received response.

7. The method according to claim 1, wherein the updated value of the first threshold is applied only responsive to the received response comprising an acknowledgement.

8. The method according to claim 1, wherein the updated value of the first threshold is applied prior to sending the information related to the updated value of the second threshold to the second radio network node.

9. The method according to claim 8, further comprising responsive to the received response being an acknowledgement:
   confirming the applied updated value of the first threshold.

10. The method according to claim 5, further comprising:
    receiving information related to values of the first and/or second thresholds from the second radio network node, the received information comprising an indication of a type of a measurement associated with the first and/or second threshold, and wherein the received information is used as input for determining the updated value of the first threshold.

11. A first radio network node of a first radio access technology, configured to communicate mobility parameter changes to a second radio network node of a second radio access technology, the first radio network node comprising:
    a processing circuit configured to determine an updated value of a first threshold controlling when a handover to the second radio access technology is triggered, and
    a communication unit configured to send information related to the updated value of the first threshold to the second radio network node, wherein the information comprises an indication of a type of a measurement associated with the first threshold,
    wherein the processing circuit is further configured to determine an updated value of a second threshold controlling when a handover from the second radio access technology to the first radio access technology is triggered,
    wherein the communication unit is further configured to send information related to the updated value of the second threshold to the second radio network node,
    wherein the communication unit is further configured to receive a response from the second radio network node, the response comprising an acknowledgement or a non-acknowledgement of the updated value of the second threshold, and
    wherein the non-acknowledgement of the updated value of the second threshold comprises at least one of: a cause of failure to implement the updated value of the second threshold, or a range of acceptable values of the updated value of the second threshold.

12. The first radio network node according to claim 11, wherein the processing circuit is configured to determine the updated value of the first threshold based on an optimization algorithm.

13. The first radio network node according to claim 11, wherein the information related to the updated value of the first threshold comprises an indication of an object relation to which the updated value of the first threshold is associated, the object relation comprising a relation between an object of the first radio access technology and an object of the second radio access technology, wherein each of said objects is one of a frequency, a cell, a radio network node, or a radio access technology.

14. The first radio network node according to claim 11, wherein the processing circuit is further configured to apply the updated value of the first threshold.

15. The first radio network node according to claim 11, wherein the information comprises an indication of a type of a measurement associated with the second threshold.

16. The first radio network node according to claim 11, wherein the processing circuit is further configured to determine new updated values of at least one of the first or the second threshold based on the received response, responsive to the received response comprising a non-acknowledgement.

17. The first radio network node according to claim 11, wherein the processing circuit is configured to apply the updated value of the first threshold only responsive to the received response comprising an acknowledgement.

18. The first radio network node according to claim 11, wherein the processing circuit is configured to apply the updated value of the first threshold prior to sending the information related to the updated value of the second threshold to the second radio network node.

19. The first radio network node according to claim 18, wherein the processing circuit is further configured to confirm the applied updated value of the first threshold responsive to the received response being an acknowledgement.

20. The first radio network node according to claim 15, wherein the communication unit is further configured to receive information related to values of the first and/or second thresholds from the second radio network node, the received information comprising an indication of a type of a measurement associated with the first and/or second threshold, and wherein the received information is used as input for determining the updated value of the first threshold.

* * * * *